J. Hungerford,
Truss,
BEST AVAILABLE COPY
~~A.~~
No 54,
A.I. Patented July 2, 1842.
No 2.
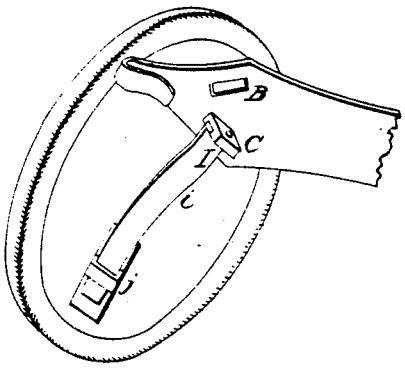
AM. PHOTO-LITHO. CO. N.Y. (OSBORNE'S PROCESS)